United States Patent
Chandler et al.

(10) Patent No.: US 12,428,991 B2
(45) Date of Patent: Sep. 30, 2025

(54) REVERSE FLOW HYDROGEN STEAM INJECTED TURBINE ENGINE

(71) Applicant: RAYTHEON TECHNOLOGIES CORPORATION, Farmington, CT (US)

(72) Inventors: Jesse M Chandler, S Windsor, CT (US); Marc J Muldoon, Marlborough, CT (US); Jon E Sobanski, Glastonbury, CT (US); Neil J Terwilliger, Cheshire, CT (US); Joseph B Staubach, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/311,460

(22) Filed: May 3, 2023

(65) Prior Publication Data
US 2024/0141837 A1    May 2, 2024

Related U.S. Application Data

(60) Provisional application No. 63/343,625, filed on May 19, 2022.

(51) Int. Cl.
*F02C 3/30* (2006.01)
*F02C 7/18* (2006.01)

(52) U.S. Cl.
CPC .......... *F02C 7/18* (2013.01); *F05D 2260/211* (2013.01)

(58) Field of Classification Search
CPC ...... F01K 21/04; F01K 21/045; F01K 21/047; F01K 23/06; F01K 23/10; F01K 23/101; F01K 23/103; F01K 23/105; F01K 23/106; F01K 23/108; F01D 25/32; F02C 3/30; F02C 3/305; F02C 7/12; F02K 3/00; F02K 3/02; F02K 3/025; F02K 3/04; F02K 3/06; F02K 3/068; F02K 3/077; F02K 3/08; F02K 3/105; F02K 3/115

See application file for complete search history.

(56) References Cited

U.S. PATENT DOCUMENTS 4,062,184 A * 12/1977 Hagen .................. F02C 3/22
    60/39.282
6,293,086 B1 * 9/2001 Reynolds ............. F02C 6/18
    60/39.55

(Continued)

OTHER PUBLICATIONS

European Search Report for European Application No. 23174391.5 mailed Oct. 17, 2023.

*Primary Examiner* — Devon C Kramer
*Assistant Examiner* — Sean V Meiller
(74) *Attorney, Agent, or Firm* — Carlson, Gaskey & Olds, P.C.

(57) ABSTRACT

A propulsion system for an aircraft includes a gas generating core engine generates an exhaust gas flow that is expanded through a turbine section, a power turbine driven by the exhaust gas flow, a propulsor coupled to the power turbine, a hydrogen fuel system configured to supply hydrogen fuel to the combustor through a fuel flow path, a condenser arranged along the core flow path and configured to extract water from the exhaust gas flow, and an evaporator arranged along the core flow path receiving a portion of the water extracted by the condenser to generate a steam flow that is injected into the core flow path upstream of the turbine section.

16 Claims, 2 Drawing Sheets

(56) References Cited

U.S. PATENT DOCUMENTS

| | | | |
|---|---|---|---|
| 8,955,304 B2* | 2/2015 | Suciu | F02C 7/04 |
| | | | 60/226.3 |
| 2016/0169102 A1 | 6/2016 | Hanrahan et al. | |
| 2021/0207500 A1 | 7/2021 | Klingels et al. | |
| 2023/0286661 A1* | 9/2023 | Klingels | B64D 29/06 |

* cited by examiner

REVERSE FLOW HYDROGEN STEAM INJECTED TURBINE ENGINE

CROSS-REFERENCE TO RELATED APPLICATION

The present disclosure claims priority to U.S. Provisional Application No. 63/343,625 filed May 19, 2022.

TECHNICAL FIELD

The present disclosure relates generally to a hydrogen powered aircraft propulsion system and, more particularly to hydrogen steam injected and intercooled turbine engine.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to atmosphere. The lost heat reduces the overall efficiency of the engine Turbine engine manufacturers continue to seek further improvements to engine performance including improvements to reduce environmental impact while improving propulsive efficiencies.

SUMMARY

A propulsion system for an aircraft according to a disclosed example embodiment includes, among other possible things, a gas generating core engine including a core flow path where a core airflow is compressed in a compressor section, communicated to a combustor section, mixed with a hydrogen based fuel and ignited to generate an exhaust gas flow that is expanded through a turbine section, a power turbine engine forward of the core engine, the power turbine configured to receive the exhaust gas flow produced by the core engine, a propulsor coupled to the power turbine, a hydrogen fuel system configured to supply hydrogen fuel to the combustor through a fuel flow path, a condenser arranged along the core flow path and configured to extract water from the exhaust gas flow, and an evaporator arranged along the core flow path and configured to receive a portion of the water extracted by the condenser to generate a steam flow, wherein the steam flow is injected into the core flow path upstream of the turbine section.

In another embodiment of the foregoing propulsion system, the turbine section of the core engine is engine forward of the compressor section and an inlet duct communicates inlet air to the compressor section.

In another embodiment of any of the foregoing propulsion systems, an exhaust gas flow is communicated engine forward from the compressor section through the turbine section and then to the power turbine.

In another embodiment of any of the foregoing propulsion systems, the evaporator is disposed within an axial space forward of the power turbine.

In another embodiment of any of the foregoing propulsion systems, an exhaust duct communicates exhaust flow from the power turbine to the condenser, wherein the exhaust duct is engine forward of the core engine.

In another embodiment of any of the foregoing propulsion systems, the condenser is in thermal communication with a cold sink.

In another embodiment of any of the foregoing propulsion systems, a water storage tank receives water extracted from the exhaust gas flow by the condenser.

In another embodiment of any of the foregoing propulsion systems, an intercooling system cools portions of the core airflow in the compressor section, wherein the intercooling system is configured inject water communicated from the condenser into the compressor section.

In another embodiment of any of the foregoing propulsion systems, a cooled cooling air passage communicates core flow from the compressor section to the turbine section, wherein a heat exchanger is disposed to cool the core flow with water from the condenser.

In another embodiment of any of the foregoing propulsion systems, the steam flow from the evaporator is injected into the combustor.

In another embodiment of any of the foregoing propulsion systems, the power turbine is configured to drive the propulsor section through the gearbox.

In another embodiment of any of the foregoing propulsion systems, the gas generating core engine includes a low pressure compressor coupled to low pressure turbine by a low shaft and a high pressure compressor coupled to a high pressure turbine by a high shaft.

A propulsion system for an aircraft according to another disclosed example embodiment includes, among other possible things, a gas generating core engine including a core flow path axially arranged through a compressor section, a combustor section and a turbine section, wherein the turbine section is engine forward of the compressor section, a hydrogen fuel system configured to supply a hydrogen fuel to the combustor through a fuel flow path, a condenser arranged engine forward of the turbine section and configured to extract water from an exhaust gas flow, and an evaporator arranged along the core flow path and configured to receive a portion of the water extracted by the condenser to generate a steam flow, wherein the steam flow is injected into the core flow path upstream of the turbine section.

In another embodiment of the foregoing propulsion system, a power turbine engine is disposed forward of the turbine section, the power turbine rotatable independent of the turbine section, wherein the exhaust gas flow is communicated engine forward from the turbine section to the power turbine.

In another embodiment of any of the foregoing propulsion systems, the evaporator is disposed within an axial space forward of the power turbine.

In another embodiment of any of the foregoing propulsion systems, an exhaust duct communicates exhaust flow from the power turbine to the condenser, wherein the exhaust duct is engine forward of the core engine.

In another embodiment of any of the foregoing propulsion systems, intercooling system cools portions of a core airflow in the compressor section, wherein the intercooling system is configured inject water communicated from the condenser into the compressor section.

In another embodiment of any of the foregoing propulsion systems, a cooled cooling air passage communicates core flow from the compressor section to the turbine section, wherein a heat exchanger is disposed to cool the core flow with water from the condenser.

In another embodiment of any of the foregoing propulsion systems, the steam flow from the evaporator is injected into the combustor.

In another embodiment of any of the foregoing propulsion systems, a gearbox is coupled to the power turbine, wherein the power turbine is configured to drive a propulsor section through the gearbox.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
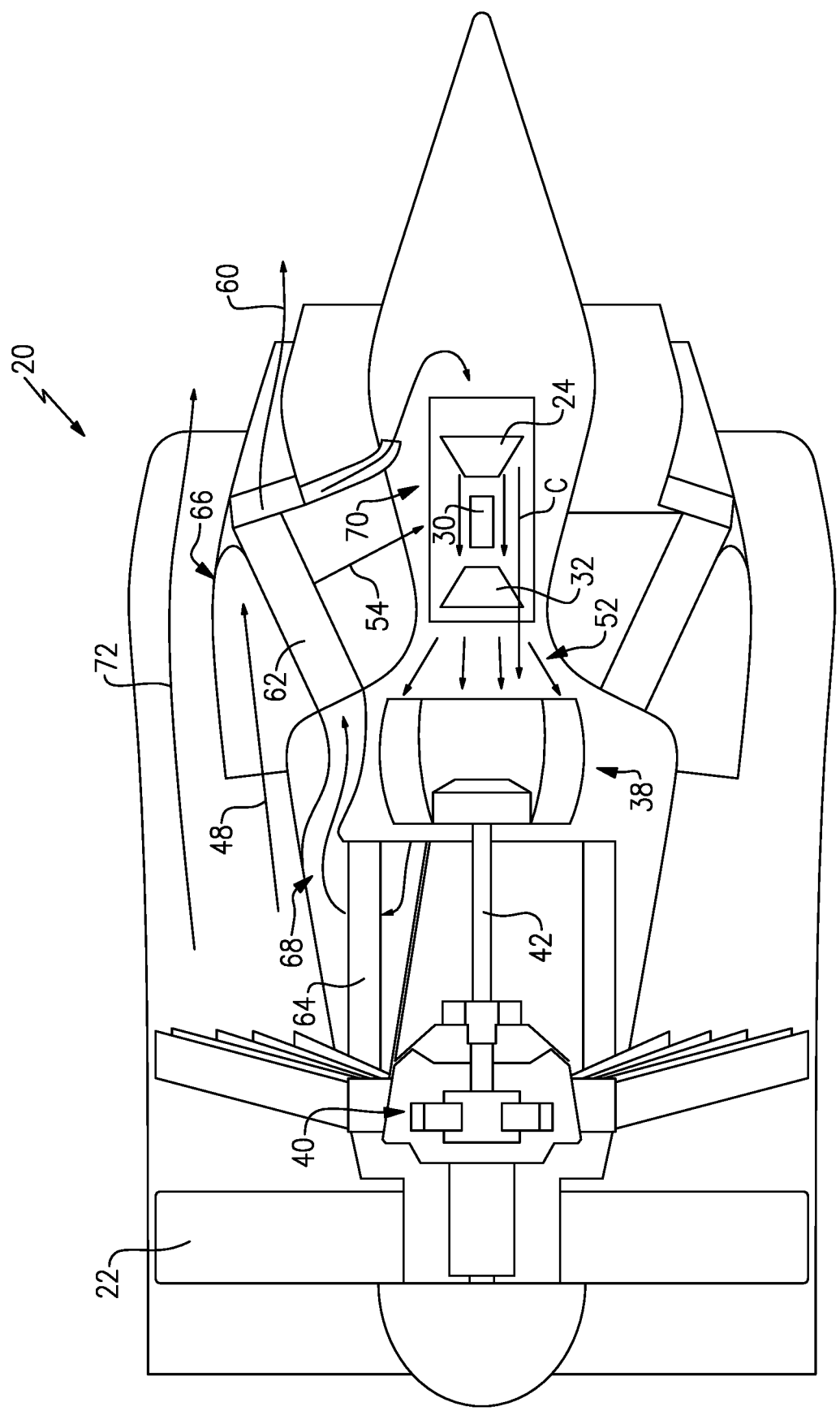
FIG. 1 is a schematic view of an example propulsion system embodiment.

FIG. 1 schematically illustrates an example reverse flow hydrogen steam injected inter-cooled turbine engine that is generally indicated at 20. The engine 20 includes a gas generating core engine 70 with a core airflow path C through a compressor section 24, a combustor 30 and a turbine section 32. The turbine section 32 is engine forward of the compressor section 24 and the combustor 30. A power turbine 38 is spaced apart from the turbine section and receives exhaust gas flow 52 from the gas generating core engine 70. The gas flow 52 expands through power turbine 38 to drive the power turbine 38 and thereby, a drive shaft 42. The drive shaft 42 drives a propulsor 22. In this disclosed embodiment, the propulsor 22 is fan driven by the drive shaft 42 through a speed reduction gearbox 40.

Figure 2:
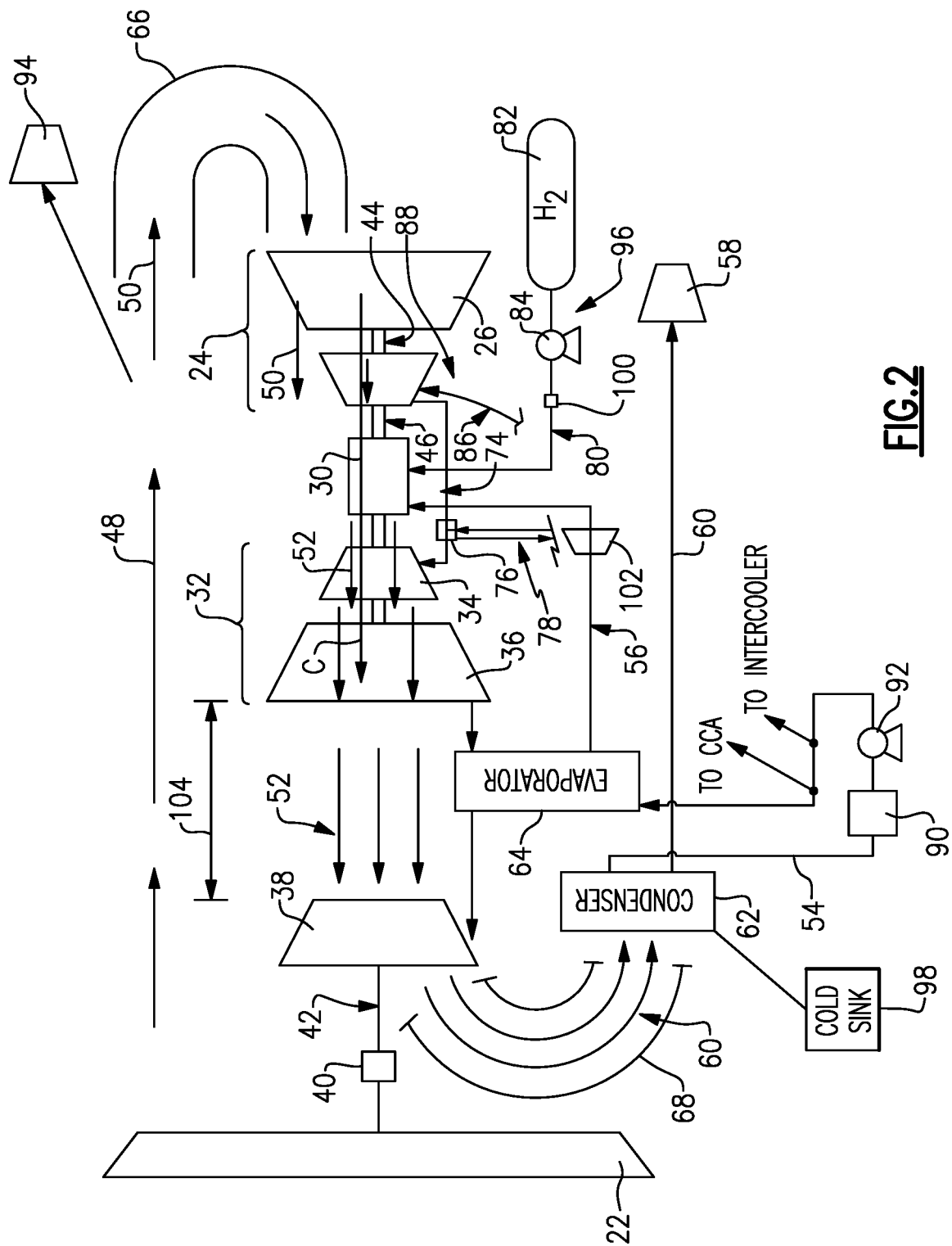
FIG. 2 is a simplified schematic view of the example propulsion system embodiment.

Referring to FIG. 2, with continued reference to FIG. 1, the fan 22 drives inlet air into an inlet duct 66 that is communicated to the compressor section 24. A core airflow 50 is communicated through the inlet duct 66 into the compressor section 24. A bypass flow 48 is communicated around and past the core engine 70.

In the compressor section 24, the core flow 50 is compressed and communicated to the combustor 30. In the combustor 30, the core flow 50 is mixed with a hydrogen ($H_2$) fuel flow 80 and ignited to generate a high energy exhaust gas flow 52 that expands through the turbine section 32 where energy is extracted and utilized to drive the compressor section 24. The exhaust gas flow exhausted from the turbine section 32 of the gas generating core engine 70 is communicated to the power turbine 38.

The power turbine 38 drives a shaft 42 that drives the fan 22. In this disclosed embodiment, the fan 22 is driven through a gearbox 40 at a speed different than the power turbine 38. It should be appreciated, that the fan 22 may be driven directly by the power turbine 38 at a speed different than the turbine section 32. The power turbine 38 may be configured to drive the fan 22 at a speed different than the turbine section because it is not coupled to the gas generating core engine 70 and is not required to drive any portion of the compressor section 24. A bypass flow 48 may bypass the core engine 70 and exit through a fan nozzle schematically shown at 94.

An exhaust duct 68 is provided to direct exhaust gas flow from the power turbine 38 to the condenser 62. The condenser 62 is configured to extract water from the exhaust gas flow 52. From the condenser 62, expelled exhaust gases 60 are exhausted through a core nozzle 58. Water extracted from the condenser 62 is converted to steam and injected into the core engine 70 to increase mass flow and thereby provide increases output power.

The engine 20 is configured to burn hydrogen provide by a fuel system 52. The fuel system 96 includes a liquid hydrogen ($LH_2$) tank 82 in communication with at least one pump 84. The pump 84 drives a fuel flow 80 to the combustor 30. $LH_2$ provides a thermal heat sink that can be utilized to cool various heat loads within the aircraft or engine as schematically indicated at 100. The heat loads may include, for example and without limitation, super conducting electrics, a working fluid of an environmental control system of the aircraft, an air conditioning heat exchanger, and engine working fluid heat exchangers. Heat accepted into the hydrogen fuel flow increase the overall fuel temperature prior to injection into the combustor 30.

A steam flow 56 generated by evaporating water in the evaporator 64 extracted from the exhaust gas flow 52 in the condenser 62 with heat from the exhaust gas flow 52 is injected into the combustor 30. In one disclosed embodiment, the evaporator 64 is disposed within an axial space 104 between the turbine section 32 and the power turbine 38. The evaporator 64 is thereby placed in thermal communication with the hot exhaust gas flow 52. Water extracted by the condenser 62 communicated to the evaporator and converted to the steam flow 56 that is subsequently injected into the core engine 70.

The generated steam flow 56 may be injected into the core airflow at the combustor 30 or just prior to the combustor to improve performance by increasing mass flow and power output without additional work required by the compressor section. Steam flow from the evaporator 72 may drive a steam turbine 102 to provide an additional work output prior to injection into the combustor 30.

The condenser 62 draws water, schematically indicated at 54, from the exhaust gas flow 52 and communicates the recovered water to water storage tank 90. The water storage tank 90 operates as an accumulator to provide sufficient water for operation during various engine operating conditions. The condenser 62 is in communication with a cold sink, schematically indicated at 98 that may be, for example, ram or fan air depending on the application and/or engine configuration.

The engine 20 has an increased power output from the injected steam 56 due to an increasing mass flow through the turbine section 32 without a corresponding increase in work from the compressor section 24. An example engine operation cycle may include up to (or more than) 35% steam-air-ratios (SAR) and may be assisted by a multiple fold (e.g., 2×, 3×, etc.) increase in moisture from burning $H_2$ as the fuel.

A water intercooling system 88 may be provide and provide a flow 86 that is communicated to the compressor section 24 to reduce a temperature of the core airflow 50 and increase mass flow. Reduced temperatures and increased mass flow provided by injection of water increases compressor efficiency. The water flow 86 may also be used as a cooling flow 78 to cool cooling air flow 74 communicated from the compressor section 24 to the turbine section 32. A heat exchanger 76 provides for the transfer of heat from the cooling air flow 74 into water. The heat from the cooling air flow 74 may vaporize the water into steam.

The example compressor section 24 includes a low pressure compressor (LPC) 26 and a high pressure compressor (HPC) 28. The turbine section 32 includes a high pressure turbine (HPT) 34 and a low pressure turbine (LPT) 38. The turbines 34, 36 and 38 are coupled to a corresponding compressor section. In this disclosed example, the high pressure turbine is coupled by a high shaft 46 to drive the high pressure compressor 28. A low shaft 44 couples the low pressure turbine 36 to the low pressure compressor 26.

A power shaft 42 is coupled to the power turbine 38 and the gearbox 40 to drive the fan 22. The example gearbox 40 is an epicyclical gear train, such as a planetary gear system, star gear system or other known gear system, with a gear reduction ratio of greater than about 2.3.

The additional power provided by the use of both hydrogen fuel and the injected steam flow 56 provides for the gas generating core engine 70 to be of a reduced size compared to engines of similar thrust capabilities. The smaller core engine 70 is further provided by the use of the power turbine 38. Because the power turbine 38 is not mechanically coupled to the core engine 70, it may be configured with respect to driving the fan 22 rather than both the fan 22 and some portion of the compressor section 24.

Although the example engine 20 is described and shown by way of example as a three spool engine, other engine configurations, such as two-spool may also benefit from this disclosure and are within the contemplation and scope of this disclosure.

Although an example engine configuration is described by way of example, it will be appreciated that other engine configurations may include additional structures and features and are within the contemplation and scope of this disclosure.

Accordingly, the disclosed assemblies provide for the advantageous use of ammonia fuel to improve engine efficiency and reduce carbon emission. The disclosed systems use the advantageous thermal capacity of ammonia to maximize the recapture of heat and cool other working flows of the engine.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising: a gas generating core engine including a core flow path where a core airflow is compressed in a compressor section, communicated to a combustor section, mixed with a hydrogen based fuel and ignited to generate an exhaust gas flow that is expanded through a turbine section; a power turbine located forward of the core engine, the power turbine configured to receive the exhaust gas flow produced by the core engine and drive a power turbine shaft; a gearbox spaced axially apart from the power turbine and coupled to the power turbine shaft; a propulsor configured to be driven by the gearbox; a hydrogen fuel system configured to supply hydrogen fuel to a combustor through a fuel flow path; a condenser arranged along the core flow path and configured to extract water from the exhaust gas flow; an evaporator arranged along the core flow path and configured to receive a portion of the water extracted by the condenser to generate a steam flow, wherein the steam flow is injected into the core flow path upstream of the turbine section, the evaporator is disposed within an axial space between the power turbine and the propulsor parallel to the power turbine shaft and the exhaust gas flow from the power turbine is directed radially outward through the evaporator to heat the portion of the water extracted by the condenser; an exhaust duct disposed radially outward from the evaporator and configured to direct the exhaust gas flow radially outward from the evaporator and axially aft to the condenser; and an inlet duct disposed radially outward of the exhaust duct and configured to direct a bypass flow radially inward to cool exhaust gas flow communicated through the condenser.

2. The propulsion system as recited in claim 1, wherein the turbine section of the core engine is engine forward of the compressor section and the inlet duct communicates inlet air to the compressor section.

3. The propulsion system as recited in claim 2, wherein the exhaust gas flow is communicated engine forward from the compressor section through the turbine section and then to the power turbine.

4. The propulsion system as recited in claim 3, including the exhaust duct communicating exhaust flow from the power turbine radially outward through the evaporator to the condenser, wherein the exhaust duct is engine forward of the core engine.

5. The propulsion system as recited in claim 4, wherein the condenser is in thermal communication with a cold sink.

6. The propulsion system as recited in claim 4, including a water storage tank configured to receive water extracted from the exhaust gas flow by the condenser.

7. The propulsion system as recited in claim 1, including an intercooling system to cool portions of the core airflow in the compressor section, wherein the intercooling system is configured inject water communicated from the condenser into the compressor section.

8. The propulsion system as recited in claim 1, including a cooled cooling air passage communicating core flow from the compressor section to the turbine section, wherein a heat exchanger is disposed to cool the core flow with water from the condenser.

9. The propulsion system as recited in claim 1, wherein the steam flow from the evaporator is injected into the combustor.

10. The propulsion system as recited in claim 1, wherein the gas generating core engine includes a low pressure compressor coupled to low pressure turbine by a low shaft and a high pressure compressor coupled to a high pressure turbine by a high shaft.

11. The propulsion system as recited in claim 1, further comprising a steam turbine configured to generate a work output from steam generated by the evaporator before injection into the core flow.

12. A propulsion system for an aircraft comprising: a gas generating core engine including a core flow path axially arranged through a compressor section, a combustor section and a turbine section, wherein the turbine section is engine forward of the compressor section; a power turbine located forward of the turbine section, the power turbine rotatable independent of the turbine section to drive a power turbine shaft, wherein the exhaust gas flow is communicated engine forward from the turbine section to the power turbine; a gearbox spaced axially forward of the power turbine and coupled to the power turbine shaft; a propulsor coupled to the gearbox and configured to be driven by the power turbine through the power turbine shaft and gearbox; a hydrogen fuel system configured to supply a hydrogen fuel to a combustor through a fuel flow path; a condenser arranged engine forward of the turbine section and configured to extract water from an exhaust gas flow; an evaporator arranged along the core flow path and configured to receive a portion of the water extracted by the condenser to generate a steam flow, wherein the steam flow is injected into the core flow path upstream of the turbine section, the evaporator is disposed within an axial space between the power turbine and the gearbox parallel to the power turbine shaft and radially outward of the power turbine; an exhaust gas duct disposed radially outward of the evaporator and configured to receive the exhaust gas flow exiting the evaporator and direct the exhaust gas flow radially outward and axially aft to the condenser; and an inlet duct disposed radially outward of the exhaust gas duct and configured to direct a bypass flow radially inward to cool the exhaust gas flow communicated through the condenser.

13. The propulsion system as recited in claim 12, including the exhaust duct communicating exhaust flow from the power turbine radially outward through the evaporator to the condenser, wherein the exhaust duct is engine forward of the core engine.

14. The propulsion system as recited in claim 12, including an intercooling system to cool portions of a core airflow in the compressor section, wherein the intercooling system is configured inject water communicated from the condenser into the compressor section.

15. The propulsion system as recited in claim 12, including a cooled cooling air passage communicating core flow from the compressor section to the turbine section, wherein a heat exchanger is disposed to cool the core flow with water from the condenser.

16. The propulsion system as recited in claim 12, wherein the steam flow from the evaporator is injected into the combustor.

* * * * *